US011552909B2

(12) United States Patent
Lopes de Moraes et al.

(10) Patent No.: US 11,552,909 B2
(45) Date of Patent: Jan. 10, 2023

(54) GENERATION OF A CHATBOT

(71) Applicant: KYNDRYL, INC., New York, NY (US)

(72) Inventors: Marcelo Lopes de Moraes, Hortolandia (BR); Anthony Miranda Vieira, Campinas (BR); Peterson Almeida, Sao Paulo (BR); Sergio Varga, Campinas (BR)

(73) Assignee: KYNDRYL, INC., New York, NY (US)

( * ) Notice: Subject to any disclaimer, the term of this patent is extended or adjusted under 35 U.S.C. 154(b) by 144 days.

(21) Appl. No.: 16/920,785

(22) Filed: Jul. 6, 2020

(65) Prior Publication Data
US 2022/0006760 A1    Jan. 6, 2022

(51) Int. Cl.
*G06F 17/00*    (2019.01)
*H04L 51/02*    (2022.01)
(Continued)

(52) U.S. Cl.
CPC .............. *H04L 51/02* (2013.01); *G06F 11/36* (2013.01); *G06F 16/35* (2019.01); *G06F 16/36* (2019.01); *G06F 40/226* (2020.01); *G06F 40/242* (2020.01)

(58) Field of Classification Search
CPC .......... H04L 51/02; G06F 11/36; G06F 16/35; G06F 16/36; G06F 40/226; G06F 40/242
See application file for complete search history.

(56) References Cited

U.S. PATENT DOCUMENTS

| 8,818,926 B2 | 8/2014 | Wallace |
| 10,200,449 B2 | 2/2019 | Koreeda |

(Continued)

FOREIGN PATENT DOCUMENTS

| CN | 103150454 B | 6/2013 |
| KR | 102004949 B1 | 7/2019 |

OTHER PUBLICATIONS

Cuayáhuitl, Heriberto, et al. "Deep reinforcement learning for chatbots using clustered actions and human-likeness rewards." 2019 international joint conference on neural networks (IJCNN). IEEE, 2019 (Year: 2019).*

(Continued)

*Primary Examiner* — Andrew T McIntosh
(74) *Attorney, Agent, or Firm* — Erik Swanson; Andrew M. Calderon; Calderon Safran & Cole P.C.

(57) ABSTRACT

A computer-implemented method, computer system, and computer program product for for generation of a chatbot. The method may include receiving data in a first format. The method may include generating one or more clusters from the received data. The method may include labeling the generated one or more clusters. The method may include exporting the one or more labeled clusters into a cluster database. The method may include generating the chatbot using the one or more labeled clusters exported from the cluster database. The method may include executing a validation script into the chatbot to generate a report. The method may include receiving a determination on an accuracy of the chatbot based on the generated report. In response to determining that the chatbot is not accurate, the method may include determining whether a manual adjustment directly on the chatbot is needed.

20 Claims, 6 Drawing Sheets

(51) Int. Cl.
*G06F 40/226* (2020.01)
*G06F 11/36* (2006.01)
*G06F 16/36* (2019.01)
*G06F 16/35* (2019.01)
*G06F 40/242* (2020.01)

(56) References Cited

U.S. PATENT DOCUMENTS

| | | | |
|---|---|---|---|
| 10,424,302 | B2 | 9/2019 | Shah |
| 10,498,898 | B2 | 12/2019 | Mazza |
| 2011/0214080 | A1* | 9/2011 | Agrawal ............... G06F 16/367 |
| | | | 715/771 |
| 2015/0120734 | A1* | 4/2015 | Kwon ................... G06F 16/901 |
| | | | 707/737 |
| 2018/0053119 | A1 | 2/2018 | Zeng |
| 2018/0131645 | A1 | 5/2018 | Magliozzi |
| 2018/0293483 | A1 | 10/2018 | Abramson |
| 2019/0065465 | A1* | 2/2019 | Cristian .............. G06F 11/3688 |
| 2019/0130415 | A1 | 5/2019 | Cheah |
| 2019/0182382 | A1* | 6/2019 | Mazza .................... H04L 51/02 |
| 2019/0243899 | A1* | 8/2019 | Yi .......................... G06F 16/00 |
| 2019/0311036 | A1 | 10/2019 | Shanmugam |
| 2019/0347326 | A1* | 11/2019 | Kozhaya ................ G06F 40/35 |
| 2021/0357802 | A1* | 11/2021 | Kolsto ................ G06K 9/6272 |

OTHER PUBLICATIONS

Cuayáhuitl, Heriberto, et al. "Ensemble-based deep reinforcement learning for chatbots." Neurocomputing 366 (2019): 118-130 (Year: 2019).*
Mell et al., "The NIST Definition of Cloud Computing", Recommendations of the National Institute of Standards and Technology, Special Publication 800-145, Sep. 2011, 7 pages.

\* cited by examiner

GENERATION OF A CHATBOT

BACKGROUND

The present invention relates generally to the field of computing, and more particularly to a chatbot. A chatbot may be a software application designed to conduct conversations with human correspondents in lieu of providing direct contact with a live human agent. The correspondent may type or ask a question and the chatbot will attempt to interpret the question, and then provide an answer.

BRIEF SUMMARY

Embodiments of the present invention may include a method, computer system, and computer program product for generation of a chatbot. Embodiments of the present invention may include receiving data in a first format. Embodiments of the present invention may include generating one or more clusters from the received data. Embodiments of the present invention may include labeling the generated one or more clusters. Embodiments of the present invention may include exporting the one or more labeled clusters into a cluster database. Embodiments of the present invention may include generating the chatbot using the one or more labeled clusters exported from the cluster database. Embodiments of the present invention may include executing a validation script into the chatbot to generate a report. The report may contain information about quality and a suggested adjustment to the chatbot. Embodiments of the present invention may include receiving a determination on an accuracy of the chatbot based on the generated report. In response to determining that the chatbot is not accurate, embodiments of the present invention may include determining whether a manual adjustment directly on the chatbot is needed. Adjustment to the chatbot may include relabeling the generated one or more clusters.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
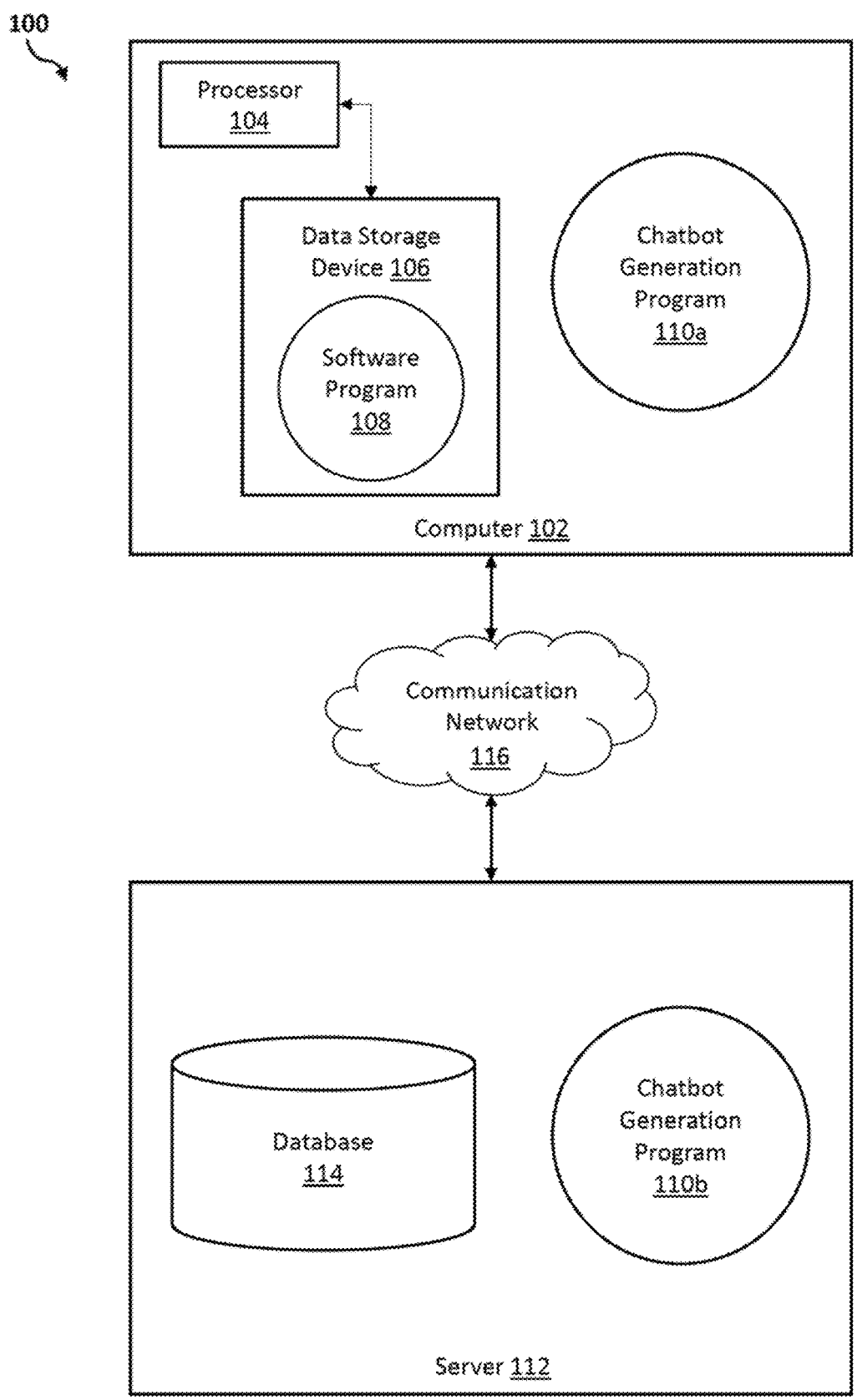
FIG. 1 illustrates a networked computer environment according to at least one embodiment.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate generally to a chatbot. More particularly, embodiments of the present invention provide a method, computer program, and computer system for generation of a chatbot. A chatbot may be a software application designed to conduct conversations with a user in lieu of providing direct contact with a live human agent. The user may type or ask a question and the chatbot may attempt to interpret the question, and then provide an answer.

Typically, generating a new chatbot takes time and effort. A specialist may be used to manually classify information, or data, required to create a ground truth. Ground truth may refer to the initial knowledge base of the chatbot. Ground truth may be divided into a training set and a test set. The training set may be used to train the chatbot whereas the testing set may be used to test the chatbot. The specialist may be a subject matter expert that may have extensive knowledge in a particular domain of a dataset. Domains may include, but are not limited to, retail, social media content, business, technology, medical, academic, government, industrial, food chain, legal or automotive.

Classifying information may include clustering the information into different clusters and labeling each cluster appropriately. As such, information may be clustered into one specific cluster that may then be labeled. Information may include, but is not limited to, frequently asked questions (FAQs) or logs of prior interactions through hand-outs, for example, tickets in a HelpDesk or emails.

The labeled cluster may be used to compose a dialog. The dialog may be used by the chatbot when conversing with the user. The process of clustering and labeling of the information may be a manual process that is time consuming and prone to errors. As such, the more information that is selected to be used in the chatbot, the longer the process of clustering and labeling of the information and the higher the chances of classification errors. During the clustering and labelling stages, the specialist may read all of the questions and may manually group each question into different clusters. Clusters may also be referred to as intent categories. An intent may refer to the goal an end user may have in mind when asking the chatbot a question. Some examples of intent categories may include, but are not limited to, paying a bill, speaking with an account representative, order status, etc.

Generally, once the chatbot is generated, using the specialist to classify information, the performance of that classification of information must be checked. This is done to determine how much of the manual classification, done by the specialist, is in fact correct. Typically, checking the performance of the classification in the chatbot is a manual process that takes time and effort. The time and effort may be proportionate to the accuracy the chatbot aims to obtain. As such, the higher the accuracy that is expected, the longer the time it takes to conduct the check on the performance of the classification.

In order to test the performance of the classification, the specialist may ask the chatbot questions. This is done to determine whether the chatbot will answer the questions accurately. Since the performance of the classification is based on the questions the specialist is asking, this may lead to bias in the test. Bias in testing may occur when the specialist tries to test the chatbot by asking the chatbot the same questions that were used to create and train the chatbot. The chatbot may always answer these questions with 100% accuracy. However, these questions do not contribute to the chatbot's test because they are biased. As such bias should be avoided in any testing of the chatbot.

Current techniques to generate a chatbot take effort on the part of the specialist, are time consuming, and may be biased. Therefore, there exists a need to automate the generation of a chatbot. The following described exemplary embodiments provide a system, method, and program product for generation of a chatbot. As such, embodiments of the present invention have the capacity to improve the technical field of chatbot generation by using machine learning to generate the chatbot by automatically classifying questions into clusters that may be used in the creation of the ground truth. Further, embodiments of the present invention allow for the generated clusters to be labeled without the use of a specialist, thus saving time and effort. In addition, by automatically labeling the clusters, embodiments of the present invention may eliminate possible mistakes made by specialist during the manual labeling of the clusters. Further, embodiments of the present invention improve the technical field of chatbot generation by automatically validating and proposing adjustments to the chatbot to increase the chatbot's accuracy.

Various types of machine learning (ML) models may be built to create predictive results for various domains. Machine learning models may also include deep learning models, active learning models and artificial intelligence (AI) models. Active learning may be used to interact with a user, such as the subject matter expert, to provide new data labels or label new datapoints. Training and updating a ML model may include supervised, unsupervised, and semi-supervised ML procedures. Supervised learning may use a labeled dataset or a labeled training set to build, train and update a model. Semi-supervised learning may use both labeled datasets and unlabeled datasets to train a deep learning model. Unsupervised learning may use all unlabeled data to train a deep learning model.

Embodiments of the present invention provide an unsupervised automatic generation of a chatbot using machine learning. As such, embodiments of the present invention do not require training any previous chatbot or data that may already be labeled. Nor do the embodiments of the present invention require a specialist to conduct the manual classification of information.

Referring to FIG. 1, an exemplary networked computer environment 100 is depicted, in accordance with an embodiment. The networked computer environment 100 may include a computer 102 with a processor 104 and a data storage device 106 that is enabled to run a software program 108 and a chatbot generation program 110a. The networked computer environment 100 may also include a server 112 that is enabled to run a chatbot generation program 110b that may interact with a database 114 and a communication network 116. The networked computer environment 100 may include a plurality of computers 102 and servers 112, only one of which is shown. The server 112 may also be a server computer. The communication network 116 may include various types of communication networks, such as a wide area network (WAN), local area network (LAN), a telecommunication network, a wireless network, a public switched network, and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), Blockchain as a Service (BaaS) or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the chatbot generation program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the chatbot generation program 110a, 110b (respectively) to generate a chatbot. The method to generate the chatbot is explained in more detail below with respect to FIGS. 2-3.

Figure 2:
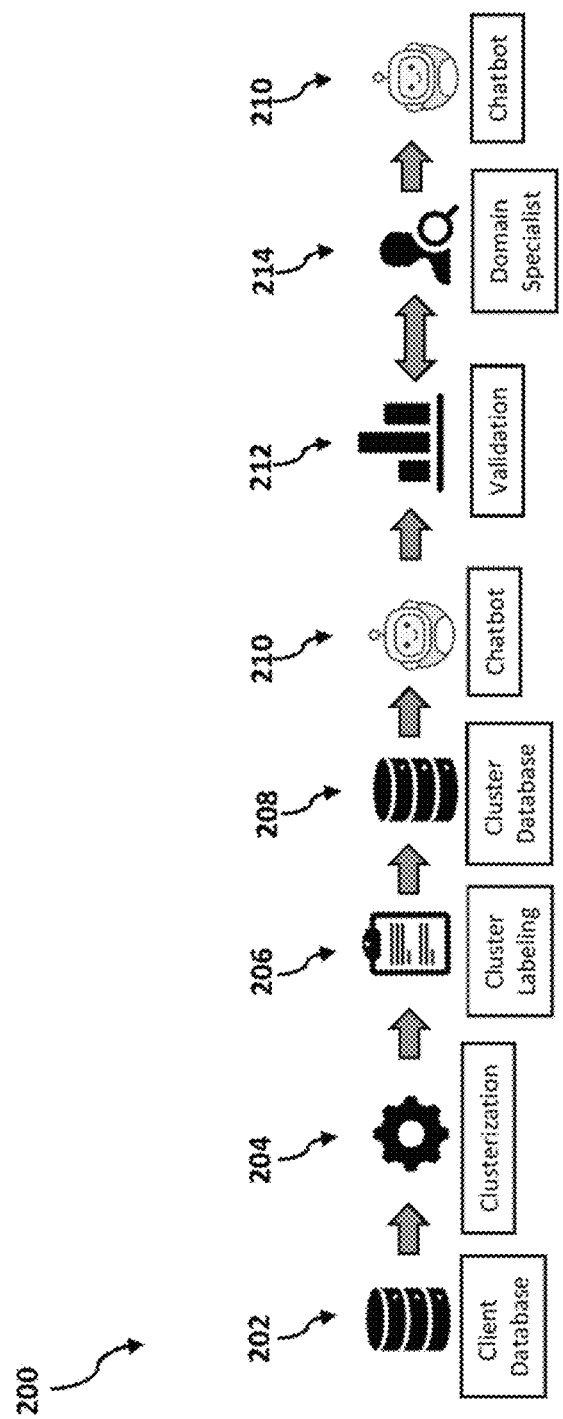
FIG. 2 is a block diagram of an example component map of a chatbot generation system, in accordance with an embodiment of the invention.

Referring to FIG. 2, a block diagram example of a component map 200 of a chatbot generation system is depicted, in accordance with an embodiment. The component map 200 may include a client database 202, a clusterization algorithm 204, a cluster labeling script 206, a cluster database 208, a chatbot 210, a validation script 212, and a domain specialist 214.

In an embodiment, the client database 202 may be a database at a client's location. The client may be any person or entity that may use the chatbot 210 to communicate with a user. The client database 202 may store all data relating to a particular domain or a plurality of domains. The data may also be known as information. The data in the client database 202 may be unlabeled. The data in the client database 202 may be structured and unstructured data. The data may include initial data that may be gathered from previous interactions between the client and the user. For example, initial data may include frequently asked questions, client's closed tickets, or previous integrations recorded (i.e. logs from previous conversations with the user). The initial data may be used as input for creating the chatbot 210.

It should be appreciated that the client database 202 is an optional feature. As such, the client may store the data in an alternative place other than the client database 202. For example, the client my store the data on the client's user device, such as, for example, a computer.

The initial data, provided by the client, may be clustered into one or more clusters using the clusterization algorithm 204. The clusterization algorithm 204 may be a machine learning algorithm. For example, the clusterization algorithm 204 may be an unsupervised algorithm, such as, for example, a k-means++ algorithm that may be used to cluster the data, or information, provided by the client. For example, the clusterization algorithm 204 may automatically cluster all data, such as, for example, questions, and aggregate them into their respective clusters. As such, like data may be clustered together to form a single cluster. For example, the initial data may include questions about paying bills and questions about speaking to human resources. As such, the clusterization algorithm 204 may cluster the questions about paying bills in one cluster and the questions about speaking to human resources into another cluster. Since the questions are directed to two different fields, the clusterization algorithm 204 may cluster them separately into their respective clusters.

The one or more clusters may also be labeled. In an embodiment, the cluster labeling script 206 may automatically label the clusters that were generated by the clusterization algorithm 204. Having the cluster labeling script 206 label the clusters may facilitate the domain specialist 214 since the domain specialist 214 does not have to manually label each cluster. In addition, the labeling done by the cluster labeling script 206 may give the domain specialist 214 an insight as to how each cluster may be labeled.

In an embodiment, the cluster labeling script 206 may take the top two most frequently appearing words from a particular cluster and use the two most frequently used words to label the cluster. The cluster labeling script 206 may count each word that appears in a particular cluster and determine the top two most frequently appearing words. The top two most frequently appearing words may be a verb and a noun. For example, the clusterization algorithm 204 may cluster all questions into two clusters. One cluster may contain questions regarding paying bills while the other cluster may contain questions regarding speaking with human resources. The cluster labeling script 206 may then look for the top two most frequently appearing words in each of the clusters and use these words to name each cluster. Continuing with the example, the cluster labeling script 206 may look at the first cluster and determine that the most frequent verb is "pay" and the most frequent noun is "bill". As such, the cluster labeling script 206 may label the cluster "pay_bill". Likewise, with the second cluster, the cluster labeling script 206 may label the cluster "call_hr" because "call" was the most frequent verb and "hr" was the most frequent noun appearing in all of the questions of that cluster.

The clustered and labeled clusters may be exported to the cluster database 208. The cluster database 208 may include information that has been separated into labeled clusters. In an embodiment, the information may include questions that the client was asked. As such, each labeled cluster may include questions relating to that particular cluster label.

All information that has been separated and labeled into clusters may be used as input for the chatbot 210. The input may also be referred to as ground truth. The chatbot 210 may include a dialog, a classifier system, and the ground truth that was used to train the classifier. The dialog may be the part of the chatbot 210 that may be used by the chatbot 210 to directly interact with the user. The classifier system may interpret the question received by the chatbot 210 from the user and determine how the chatbot 210 should answer the question. The classifier system may utilize any known techniques, such as, for example, natural language processing, to interpret the question. The ground truth may refer to a set of sample utterances, or predicted answers, that are marked with target intents and entities. The ground truth may include questions, intents, and entities.

After the chatbot 210 is generated, the validation script 212 may be used to determine the quality of the clusterization and labeling. The validation script 212 may be an automated statistical technique that may be developed in Python language or any other computer language that is applicable. The validation script 212 may use a k-fold cross validation technique to infer the chatbot's accuracy in answering questions asked by the user. The validation script 212 may randomly partition the chatbot's training and testing ground truth that is clustered and labeled. In an embodiment, the recommend partitioning percentage of the ground truth may be 70% for the training set and 30% for the testing set. Using the k-fold cross validation technique, the validation script 212 may conduct the partitioning process k times. In an embodiment, the minimum value of k may be k=1 with a suggested value of k=5.

The validation script 212 may provide suggested adjustments about possible mistakes the clusterization algorithm 204 may have made during the clustering of questions. The validation script 212 may also provide suggested adjustments about possible labeling mistakes the cluster labeling script 206 may have made during the labeling of each cluster.

In an embodiment, the validation script 212 may use a confusion matrix to provide the suggested adjustments. The confusion matrix may be a matrix that may show all of the classifications done by the chatbot 210 while in use. In an embodiment, classification may refer to the clusterization and labeling performed by the clusterization algorithm 204 and the cluster labeling script 206, respectively. The confusion matrix may show both right and wrong classifications that were conducted during the clusterization of questions into clusters. The confusion matrix may show the expected classification for a given question and the classification that was done by the chatbot 210. The accuracy of the chatbot 210 may be generated by the following statistical formula calculated over the confusion matrix:

$$\text{Accuracy} = \frac{(\text{True Positive} + \text{True Negative})}{\left(\begin{array}{c}\text{True Positive} + \text{True Negative} + \\ \text{False Positive} + \text{False Negative}\end{array}\right)}$$

True Positive, True Negative, False Positive, and False Negative may refer to test results where:

True Positive=test result that detects the condition when the condition is present.

True Negative=test result that does not detect the condition when the condition is absent.

False Positive=test result that detects the condition when the condition is absent.

False Negative=test result that does not detect the condition when the condition is present.

The validation script 212 may generate a report for the domain specialist 214. The domain specialist 214 may be a subject matter expert that may have extensive knowledge in a particular domain. The domain specialist 214 may curate the created clusters and their nomenclatures, such as, for example, cluster labels. The domain specialist 214 may perform adjustments to the clusters and the clusters' nomenclatures, if needed, based on the report generated by the validation script 212.

The domain specialist 214 may analyze the report generated by the validation script 212 and determine whether adjustments are necessary. For example, the domain specialist 214 may determine that some questions in one cluster do not belong in that cluster. Rather, these questions belong in a different cluster. As such, the domain specialist 214 may manually move some questions from one cluster to another. The domain specialist 214 may also adjust the labels of the clusters. For example, the domain specialist 214 may change the label of a cluster, effectively relabeling that cluster.

Figure 3:
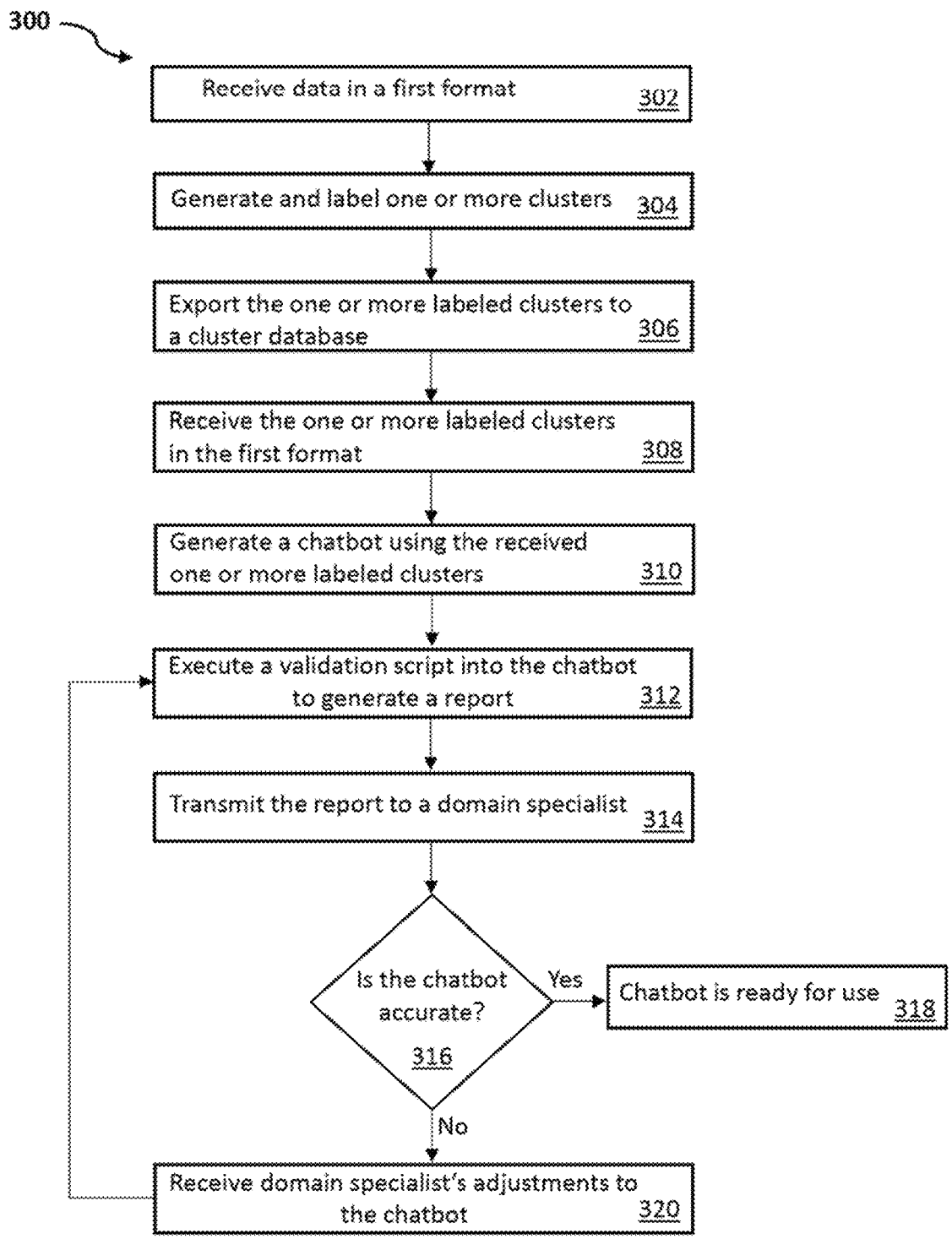
FIG. 3 is an operational flow chart illustrating a process for generation of a chatbot, in accordance with an embodiment of the invention.

Referring now to FIG. 3, an operational flow chart 300 according to at least one embodiment is depicted. The operational flow chart 300 illustrates the generation of the chatbot 210 by the chatbot generation program 110a, 110b.

At operation 302, data in a first format is received. The first format may be a comma-separated values (csv) file. The csv file may allow the information to be saved in a tabular format. The data may be provided by a client. For example, in an embodiment, the client may store all of the client's information in the client database 202, illustrated in FIG. 2. In an alternative embodiment, the client may store the client's information in another place, other than the client database 202.

The client may take all of the client's information and separate the information into many categories. For example, the client may have accounting information respecting the client's business as well as information relating to employees. The client may not wish to have all of the client's information used in the chatbot. As such, the client may separate the information into two categories, one category may have information that may be used in the chatbot and the other category may have all remaining information. For example, the client may separate the accounting information from the information relating to the client's employees. Once the information is separated, the client may then take the information that may be used in the chatbot and convert it into the csv file and export the csv file to the chatbot generation program 110a, 110b. For example, the client may take the information relating to the client's employees and convert it into the csv file.

At operation 304, one or more clusters are generated and labeled. Once the csv file with the client's information is received, the clusterization algorithm 204 may be used to cluster the information, contained in the csv file, into one or more clusters. For example, the clusterization algorithm 204 may determine that the information in the csv file pertains to three categories, doubts about vacation, doubts about paycheck, and questions about family leave. As such, the clusterization algorithm 204 may cluster the information into three clusters. Cluster 1 may contain all information from the csv file respecting vacation. Cluster 2 may contain all information from the csv file respecting doubts about paychecks. Cluster 3 may contain all information from the csv file respecting Family and Medical Leave Act (FMLA).

Once the clusterization algorithm 204 clusters the information into one or more clusters, the cluster labeling script 206 may then label each cluster. For example, continuing with the example from above, the labeling script 206 may take cluster 1 and run a script on the information contained in cluster 1 to determine the two most frequently appearing words in that cluster. In an embodiment, the two most frequently appearing words may be a noun and a verb. In an alternative embodiment, the two most frequently appearing words may be two nouns. Since cluster 1 may contain information, such as, for example, questions, respecting vacation balance, the two most the most frequently appearing words may be "vacation" and "balance". As such, the cluster labeling script 206 may label the cluster "vacation balance". Respecting cluster 2, the cluster labeling script 206 may label the cluster "deposit_paycheck" because the two most frequently appearing words may be "deposit" and "paycheck". Likewise, with cluster 3, the cluster labeling script 206 may label the cluster "FMLA_requirements" because "FMLA" and "requirements" are the two most frequently appearing words in that cluster.

At operation 306, the one or more labeled clusters are exported to the cluster database 208. The cluster database 208 may include all information that has been separated into clusters that have also been labeled. The cluster database 208 may also include all the clustered and labelled information as a csv file. In an embodiment, the cluster database 208 may reside in the chatbot generation program 110a, 110b. In an alternative embodiment, the cluster database 208 may reside in a server 112.

At operation 308, the one or more labeled clusters in the first format is received from the cluster database 208. The first format may be a comma-separated values (csv) file. For example, a user, such as an Artificial Intelligence (AI) engineer, may export from the cluster database 208 to the chatbot generation program 110a, 110b, a csv file that contains the one or more labeled clusters. The AI engineer may then use the one or more labeled clusters in the csv file to generate, at operation 310, the chatbot 210 using known techniques.

Once the chatbot 210 is generated, a validation script 212 may be executed, at operation 312. The validation script 212 may be used to determine the quality of the clusterization. The validation script 212 may infer the chatbot's accuracy in answering questions asked by the user. The validation script 212 may also be used to determine the accuracy of the labeling.

The validation script 212 may be executed at different frequencies. In an embodiment, the validation script 212 may be executed after each use of the chatbot 210. For example, the validation script 212 may be executed every time the domain specialist's adjustments to the chatbot 210 are received. In an alternative embodiment, the validation script 212 may be executed at a set frequency. For example, the set frequency may be once an hour, once every six hours, once per day, once per week, once per month, or any other applicable frequency variation.

The validation script 212 may generate a report which may provide suggested adjustments about possible mistakes the clusterization algorithm 204 may have made during the clustering of questions. The report may also provide suggested adjustments that may be made to the cluster labels. In an embodiment, the validation script 212 may generate the report each time the chatbot 210 is checked for accuracy, irrespective of whether the chatbot 210 requires adjustments. In an alternative embodiment, the validation script 212 may generate the report only when the validation script 212 determines that adjustment to the chatbot 210 are needed. As such, when the validation script 212 determines that no adjustments to the chatbot 210 are needed, the validation script 212 may not generate the report.

The report may include information such as, for example, cluster distribution, cluster accuracy, cluster confidence, precision of the chatbot 210, or any other information that may be useful in determining the accuracy of the chatbot 210. Cluster distribution may refer to a metric that shows how the ground truth of the chatbot 210 is organized. It may show the number of clusters presented in the ground truth and the number of examples each cluster may have. Examples may include information, such as, for example, questions. In an embodiment, the ground truth should have a similar number of examples in each cluster. A large discrepancy between the number of examples in each cluster may have a negative effect on the chatbot's performance. For example, the biggest cluster may have more than three times the number of examples than the smallest cluster. As such, the data provided by the client to create the chatbot may have more examples from one domain and a limited number of examples from another domain. This discrepancy between the number of examples may indicate that the ground truth has a bias. This bias may have a negative impact on the chatbot performance.

Cluster accuracy may look at all of the predicted answers, or utterances, done by the chatbot 210 to determine how many of those utterances are correct. Cluster accuracy may be calculated over the confusion matrix and may be defined as the total number of utterances predicted correctly by the chatbot 210 divided by the total number of utterances (N). This may include all utterances that are actually positive and the chatbot 210 predicted as positive ($N_{TP}$) as well as all utterances that are actually negative and the chatbot 210 predicted as negative ($N_{TN}$).

Cluster confidence may refer to the confidence of the chatbot in classifying a given example in each one of its clusters. For example, the chatbot 210 may have 10 clusters. When the chatbot 210 is confident about its accuracy, the chatbot 210 may present a confidence value of around 100% for one of its clusters, and a value closer to 0% for the remaining 9 clusters. On the other hand, when the chatbot 210 is not confident about its accuracy, the chatbot 210 may present similar confidence values for at least two of its clusters.

The precision of the chatbot 210 may refer to how precise the chatbot 210 may have been in predicting an utterance to be of a certain class. That is, of all the utterances predicted to be of a certain class, how many of those utterances are actually labeled with that class. Precision may be computed over the confusion matrix using the following formula:

$$\text{Precision} = \frac{N_{TP}}{N_{PP}} = \frac{N_{TP}}{N_{TP} + N_{FP}}$$

Effectively, precision may be defined as the total number of true positive utterances ($N_{TP}$) divided by the total number of utterances predicted as positive ($N_{PP}$). The total number of utterances predicted as positive may include both true positive utterances ($N_{TP}$) and false positive utterances ($N_{FP}$).

At operation 314, the report generated by the validation script 212 may be transmitted to a domain specialist. The domain specialist 214 may analyze the report to determine whether adjustments to the chatbot 210 are necessary. For example, the report may have annotations done by the validation script 212 as to which example may have been classified incorrectly by the chatbot 210 and what the correct classification for that example should be.

Once the domain specialist 214 analyzes the report, the domain specialist 214 may determine, at operation 316, whether the chatbot 210 is accurate. For example, the chatbot 210 may be accurate if the report states that the chatbot's precision is 100%. In another example, the chatbot 210 may be accurate if the report states that the chatbot's precision is 90%. If the chatbot 210 is accurate and no adjustments need to be made, then at operation 318 the chatbot 210 is ready for use. However, if at operation 316, it is determined that the chatbot 210 is not accurate, the process moves to operation 320.

At operation 320, the domain specialist's adjustments to the chatbot 210 are received. If it is determined that the chatbot 210 is not accurate, the domain specialist 214 may adjust the information within the clusters or the cluster labels to improve the accuracy of the chatbot 210. In an embodiment, the domain specialist 214 may follow the suggestions in the report and move some of the information from one cluster to another cluster. For example, the chatbot 210 may include three clusters, cluster 1, cluster 2, and cluster 3. The cluster labeling script 206 labeled clusters 1, 2, and 3 as "vacation_balance", "deposit_paycheck", and "FMLA_requirements", respectively. Based on the report, the domain specialist 214 determines that cluster 1 includes some information that should be in cluster 2 because that information pertains to various ways of depositing a paycheck. As a result, the domain specialist 214 may move that information from cluster 1 ("vacation_balance") to cluster 2 ("deposit_paycheck").

The domain specialist 214 may also relabel the clusters that the report indicated as being labeled incorrectly. Continuing with the example from above, the domain specialist 214 may determine that cluster 3 should have a different label. Currently, cluster 3 is labeled as "FMLA_requirements". However, a more proper name for cluster 3 may be "FMLA_benefits". As such, the domain specialist 214 may change the name of cluster 3 from "FMLA_requirements" to "FMLA_benefits".

It should be appreciated that the domain specialist may choose to follow the suggestions provided in the report and adjust the chatbot 210 accordingly. The domain specialist may also choose to ignore the suggestions provided in the report and make adjustments to the chatbot 210 based on the domain specialist's expertise.

Once the adjustments to the chatbot 210 are made, the process moves back to operation 312 where the validation script 212 is executed in order to validate the adjustments made by the domain specialist 214. In an embodiment, a confirmation that the adjustment to the chatbot is made may be provided.

It should be appreciated that FIGS. 2-3 provide only an illustration of one embodiment and do not imply any limitations with regard to how different embodiments may be implemented. Many modifications to the depicted embodiment(s) may be made based on design and implementation requirements.

Figure 4:
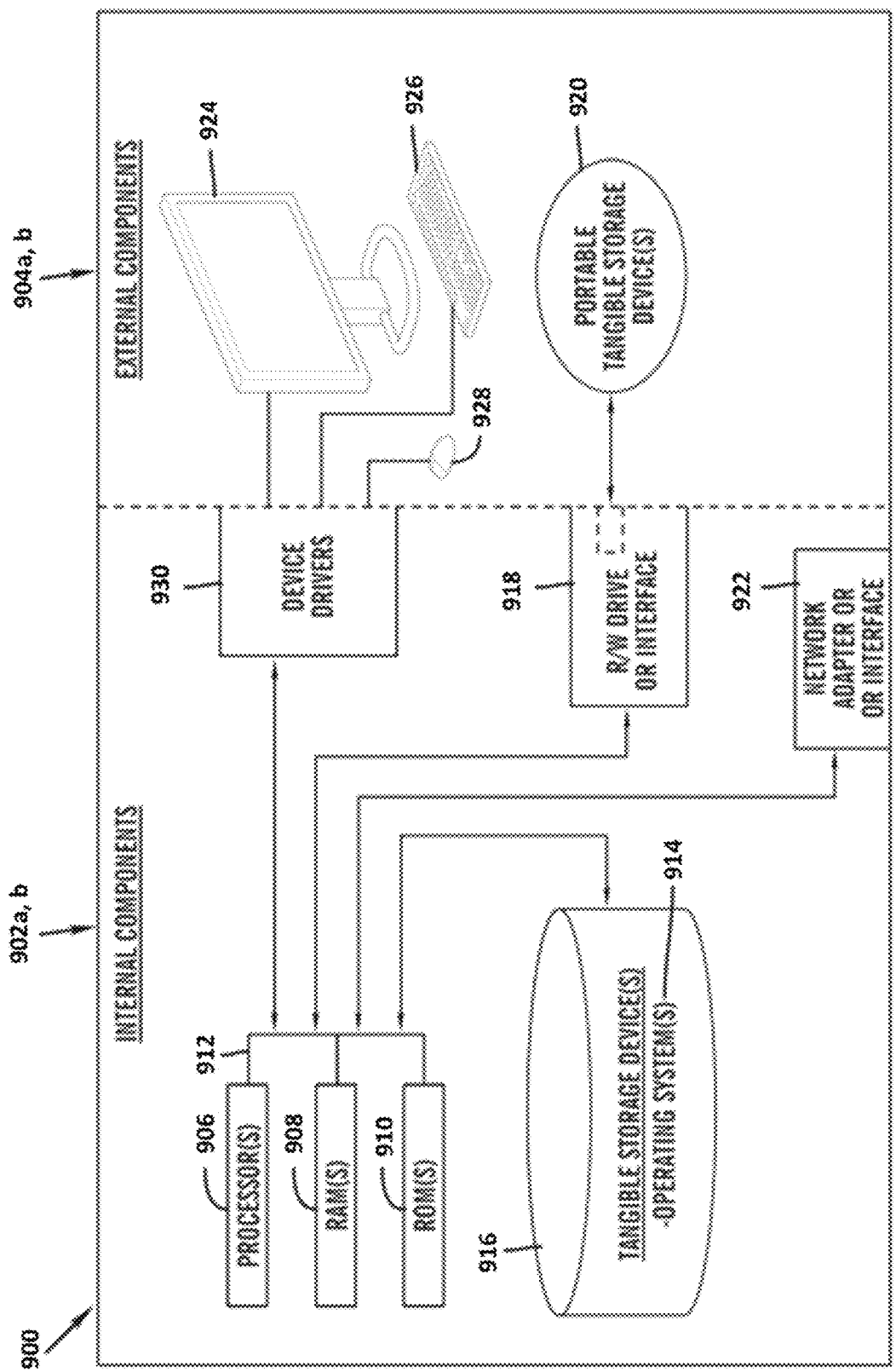
FIG. 4 is a block diagram depicting internal and external components of computers and servers depicted in FIG. 1, in accordance with an embodiment of the invention.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The computers depicted in FIG. 1 may be representative of any electronic device capable of executing machine-readable program instructions. The computers may be representative of a smart phone, a computer system, PDA, or other electronic devices. Examples of computing systems, environments, and/or configurations may include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b, and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the chatbot generation program 110a in client computer 102, and the chatbot generation program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the chatbot generation program 110a, 110b can be stored on one or more of the respective portable computer-readable tangible storage devices 920, read via the respective R/W drive or interface 918 and loaded into the respective hard drive.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the chatbot generation program 110a in client computer 102 and the deep learning program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the chatbot generation program 110a in client computer 102 and the chatbot generation program 110b in network server computer 112 are loaded into the respective hard drive. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems, or storage. The consumer does not manage or control the underlying web-based or cloud-based infrastructure including databases, corpora, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
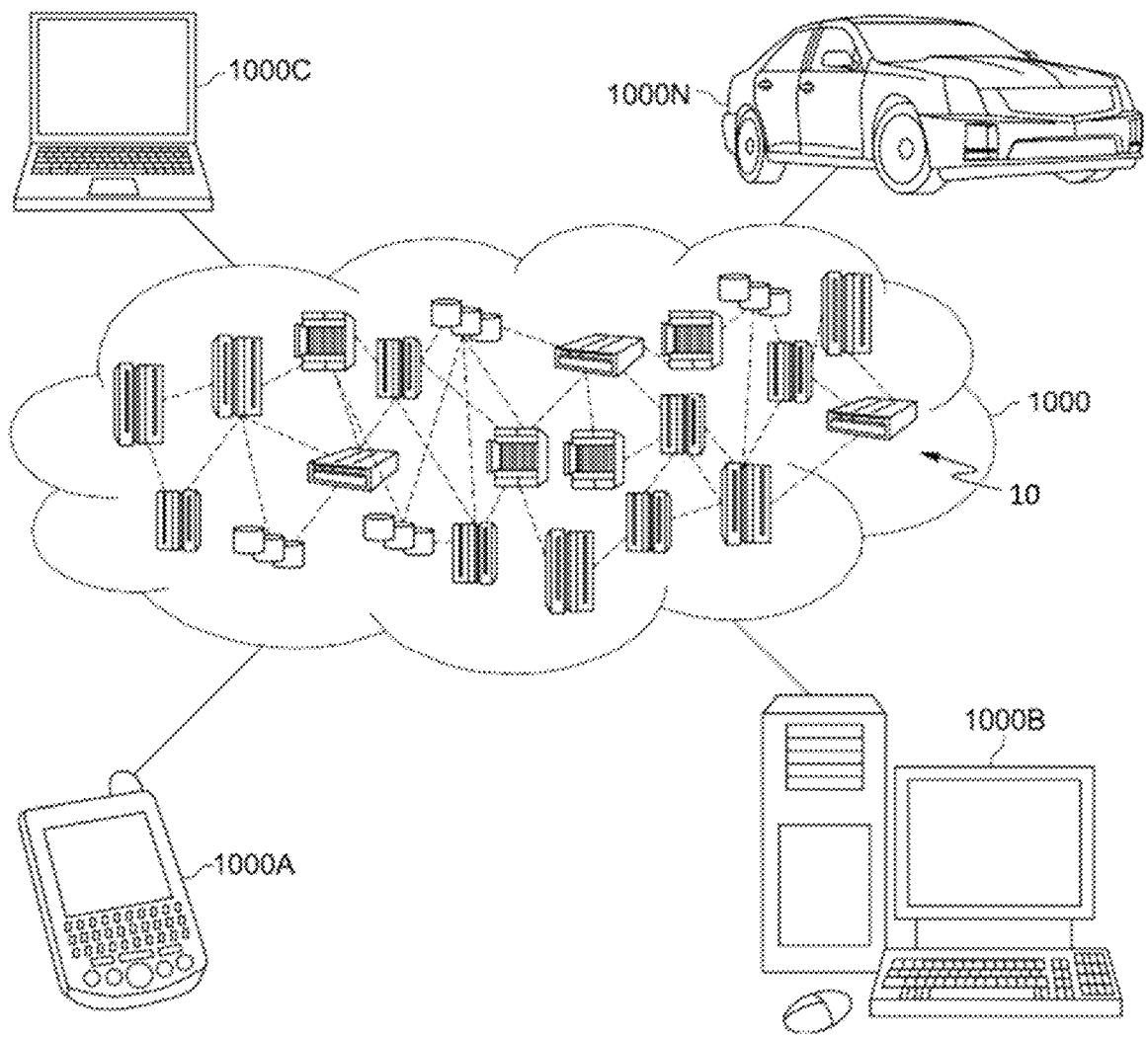
FIG. 5 is a functional block diagram depicting a cloud computing environment including the computer system depicted in FIG. 1, in accordance with an embodiment of the invention.

Referring now to FIG. 5, illustrative cloud computing environment 1000 is depicted. As shown, cloud computing environment 1000 comprises one or more cloud computing nodes 10 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 10 and cloud computing environment 1000 can communicate with any type of computerized device over any type of network and/or network addressable connection (e.g., using a web browser).

Figure 6:
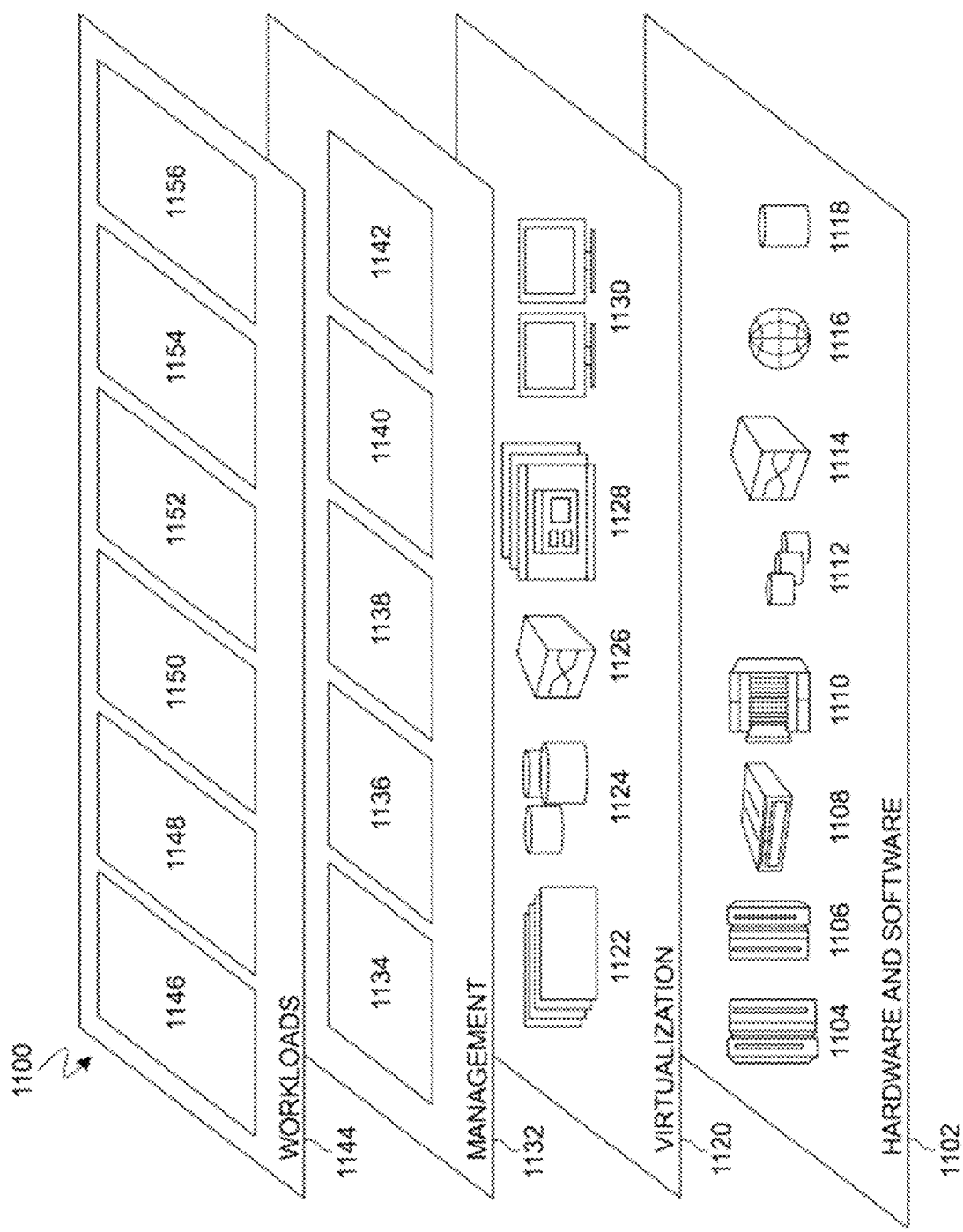
FIG. 6 is a diagram depicting abstraction model layers provided by the cloud computing environment of FIG. 5, in accordance with an embodiment of the invention.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and deep model learning 1156. A chatbot generation program 110a, 110b provides a way to use provenance data to gain insights during a deep learning model training phase.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generation of a chatbot, the computer-implemented method comprising:
   receiving data in a first format;
   generating one or more clusters from the received data;
   labeling the generated one or more clusters;
   exporting the one or more labeled clusters into a cluster database;
   generating the chatbot using the one or more labeled clusters exported from the cluster database;
   executing a validation script that applies automated cross validation of the one or more labeled clusters into the chatbot to generate a report;
   receiving a determination on an accuracy of the chatbot based on the generated report; and
   in response to determining that the chatbot is not accurate, determining whether a manual adjustment directly on the chatbot is needed,
   wherein the generated report contains information about quality and a suggested adjustment to the chatbot, the information about the quality including accuracy of responses and accuracy of the labeling of the generated one or more clusters.

2. The computer-implemented method of claim 1, further comprising:
   in response to determining that the chatbot is not accurate, receiving confirmation of the adjustment to the chatbot.

3. The computer-implemented method of claim 1, further comprising:
   in response to determining that the chatbot is accurate based upon a precision value in the generated report, determining that the chatbot is ready for use.

4. The computer-implemented method of claim 1, wherein receiving the data in the first format further comprising:
   separating the data from all data in a database; and
   converting the separated data into the first format.

5. The computer-implemented method of claim 1, wherein the generated report containing the information about the quality includes a cluster distribution metric, a cluster confidence value, and a precision value.

6. The computer-implemented method of claim 1, wherein the adjustment to the chatbot comprises:
   relabeling the generated one or more clusters based upon suggestions provided in the generated report by a confusion matrix showing an expected classification of the one or more clusters.

7. The computer-implemented method of claim 1, wherein the one or more labeled clusters exported from the cluster database is in the first format.

8. The computer-implemented method of claim 1, wherein the cluster database contains all data separated into labeled clusters.

9. A computer system for generation of a chatbot, comprising:
   one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
   receiving data in a first format;
   generating one or more clusters from the received data;
   labeling the generated one or more clusters;
   exporting the one or more labeled clusters into a cluster database;
   generating the chatbot using the one or more labeled clusters exported from the cluster database;
   executing a validation script that applies automated cross validation of the one or more labeled clusters into the chatbot to generate a report;
   receiving a determination on an accuracy of the chatbot based on the generated report; and
   in response to determining that the chatbot is not accurate, determining whether a manual adjustment directly on the chatbot is needed,
   wherein the generated report contains information about quality and a suggested adjustment to the chatbot, the information about the quality including accuracy of responses and accuracy of the labeling of the generated one or more clusters.

10. The computer system of claim 9, further comprising:
    in response to determining that the chatbot is not accurate, receiving confirmation of the adjustment to the chatbot.

11. The computer system of claim 9, further comprising:
    in response to determining that the chatbot is accurate based upon a precision value in the generated report, determining that the chatbot is ready for use.

12. The computer system of claim 9, wherein receiving the data in the first format further comprising:
    separating the data from all data in a database; and
    converting the separated data into the first format.

13. The computer system of claim 9, wherein the generated report containing the information about the quality includes a cluster distribution metric, a cluster confidence value, and a precision value.

14. The computer system of claim 9, wherein the adjustment to the chatbot comprises:
    relabeling the generated one or more clusters based upon suggestions provided in the generated report by a confusion matrix showing an expected classification of the one or more clusters.

15. The computer system of claim 9, wherein the one or more labeled clusters exported from the cluster database is in the first format.

16. The computer system of claim 9, wherein the cluster database contains all data separated into labeled clusters.

17. A computer program product for generation of a chatbot, comprising:
    one or more computer-readable tangible storage media and program instructions stored on at least one of the one or more computer-readable tangible storage media, the program instructions executable by a processor to cause the processor to perform a method comprising:
    receiving data in a first format;
    generating one or more clusters from the received data;
    labeling the generated one or more clusters;
    exporting the one or more labeled clusters into a cluster database;
    generating the chatbot using the one or more labeled clusters exported from the cluster database;
    executing a validation script that applies automated cross validation of the one or more labeled clusters into the chatbot to generate a report;
    receiving a determination on an accuracy of the chatbot based on the generated report; and in response to determining that the chatbot is not accurate, determining whether a manual adjustment directly on the chatbot is needed, wherein the generated report contains information about quality and a suggested adjustment to the chatbot, the information about the quality including accuracy of responses and accuracy of the labeling of the generated one or more clusters.

18. The computer program product of claim 17, further comprising:

in response to determining that the chatbot is not accurate, receiving confirmation of the adjustment to the chatbot.

19. The computer program product of claim 17, further comprising:

in response to determining that the chatbot is accurate based upon a precision value in the generated report, determining that the chatbot is ready for use.

20. The computer program product of claim 17, wherein receiving the data in the first format further comprising:

separating the data from all data in a database; and converting the separated data into the first format, the first format comprising a comma-values separated file.

* * * * *